(12) United States Patent  
Dümmen (10) Patent No.: US 7,082,718 B2  
(45) Date of Patent: Aug. 1, 2006

(54) CULTURE TRAY FOR THE ROOTING OF YOUNG PLANTS

(76) Inventor: Marga Dümmen, Dammweg 20, D-47495 Rheinberg (DE)

( * ) Notice: Subject to any disclaimer, the term of this patent is extended or adjusted under 35 U.S.C. 154(b) by 0 days.

(21) Appl. No.: 10/391,247

(22) Filed: Mar. 18, 2003

(65) Prior Publication Data

US 2003/0217509 A1 Nov. 27, 2003

(30) Foreign Application Priority Data

Mar. 18, 2002 (DE) ................................. 102 11 723

(51) Int. Cl.  
*A01G 9/02* (2006.01)

(52) U.S. Cl. ................. 47/86; 47/66.5; 47/85

(58) Field of Classification Search ............ 47/77, 47/85, 86, 66.3, 66.4, 66.5, 87, 65.9, 66.1, 47/73, 62 C; 220/608, 605, 507, 555, 553; 206/423, 564, 587

See application file for complete search history.

(56) References Cited

U.S. PATENT DOCUMENTS

| | | | |
|---|---|---|---|
| 3,447,261 A * | 6/1969 | Archibald | 47/77 |
| 4,050,188 A | 9/1977 | Van Wingerden | |
| 4,291,494 A * | 9/1981 | Knablein et al. | 47/17 |
| 2002/0035803 A1 | 3/2002 | Dummen | |

FOREIGN PATENT DOCUMENTS

| | | | |
|---|---|---|---|
| DE | 198 44 020 | | 4/2000 |
| EP | 0 464 954 | | 1/1991 |
| EP | 498971 A | * | 8/1992 |
| EP | 0 988 783 | | 3/2000 |
| FR | 2 661 068 | | 10/1991 |
| GB | 2 060 342 | * | 5/1981 |

* cited by examiner

*Primary Examiner*—T. Nguyen  
(74) *Attorney, Agent, or Firm*—Collard & Roe, P.C.

(57) ABSTRACT

A culture tray, in particular for the rooting of young plants, includes channels that run in parallel and at predefinable distances and serve to accommodate young plants. To enable removal of individual young plants preferably without harming them and to enable relatively economical consumption of water for the young plants the space for each young plant is limited by the sidewalls of the channel and across the longitudinal direction of the channel by partition webs. This arrangement will, in particular, ensure that the water is directly supplied to each plant space and, moreover, that the plants can be pushed sideways out of the culture tray by pushing out of the culture tray the web and ledge skeletons, and the plants are easy to take out, because there are then no sidewalls. The embodiment of the culture tray warrants uniform moistening of all existing plant spaces and ensures that even those plants receive enough water that are, for example, partly covered by large leaves of adjacent plants, since the water draining down the elevations flows into each individual plant space.

13 Claims, 7 Drawing Sheets

CULTURE TRAY FOR THE ROOTING OF YOUNG PLANTS

CROSS REFERENCE TO RELATED APPLICATIONS

Applicant claims priority under 35 U.S.C. 119 of German Application No. 102 11 723.3 filed Mar. 18, 2002.

BACKGROUND OF THE INVENTION

1. Field of the Invention

This invention relates to a culture tray, in particular for the rooting of young plants, with parallelled and mutually spaced channels for the accommodation of the young plants.

2. The Prior Art

Culture trays of these types are employed in greenhouses in great numbers for the rooting of young plants, the greenhouses offering a climate favourable for the desired culture plants and an appropriate moisture of the air. It is especially advantageous in this connection, if the rate of water flow used for the control of the humidity of the air and for the watering of the young plants can be kept constant within narrow limits and the flow is still sufficient to provide each young plant with enough water.

The German patent specification DE 198 44 020 typically relates to a culture tray for the rooting of young plants which has parallel and mutually spaced grooves in the form of channels for the accommodation of the young plants. The culture tray has a raised and surrounding edge to warrant sufficient tray stability. The base of the culture tray is shaped to form separate and parallelled channels and a roof-shaped elevation between every two adjacent channels. A given number of interconnected multiple pots with young plants is suspended in each channel so that the pot collars fully cover the pertaining channel and, in particular, the lateral supporting faces. This condition ensures that the water intended for irrigation fully flows over the roof-shaped intermediate zones into the multiple pots, unless the pots are irrigated directly. All surplus water flows through cutouts in the multiple pots and a drain hole in each channel to a water collecting tank.

FR 2 661 068 A1 also describes a culture tray that is equipped with holes in the base zone suitable for the accommodation of downwardly oriented pots and equipped with a surrounding edge which encloses the culture tray. The tray base is arranged lower than the edge, and there are transverse grooves in the tray base at predefinable distances apart from one another to form a rectangular culture tray that is able to receive a defined number of individual pots. The base of the tray has longitudinal channels to suit the longitudinal arrangement of the pots, the channels so distanced relative to each other that one full longitudinal row of pots extends into another longitudinal channel of the tray base.

It must be regarded as a drawback of the well-known embodiment of a culture tray that lifting the young plants out of the multiple pots may be difficult after the roots have grown. This may typically be due to the fact that the earth is difficult to remove from the multiple pots because of the growth of the roots and the grown size of the root and soil bale. It has also been found that the plants when being taken out of the multiple pots often suffer damage. Where former-type culture trays were used, the consumption of the water required for the irrigation of the young plants was generally quite high, and plant diseases, especially fungal diseases, were favoured thereby. In addition, water is not everywhere available in sufficient amounts to irrigate the young plants, depending on the cultivation region.

SUMMARY OF THE INVENTION

It is the aim of the invention to provide a new type of culture tray which requires a relatively small amount of water for the irrigation of the plants and which additionally allows the removal of each young plant almost without damage to the plant.

In accordance with the invention this aim is achieved by the fact that the space receiving each young plant is limited by the sidewalls of the channel and across the longitudinal direction of the channel by transverse partition webs. Such shaping of the space for each young plant in accordance with the invention definitely ensures that no jamming among multiple pots and the existing channels in the culture tray can occur. What as more, the sidewalls of the channels form part of the space in which the young plants can develop. The plant spaces are limited in the longitudinal direction of the channels by the partition webs, which means both that much less material is required to form the plant spaces and that a larger planting volume is available, or the channel need not be so deep to achieve the same space volume. The special advantage of the embodiment of the invention lies in the fact that the water intended for plant irrigation flows immediately into the plant space and can in no way get lost among multiple pots and culture tray bases. The culture tray in accordance with the invention warrants uniform moistening of all plants even if large leaves cover the root zones of adjacent plants. So no plants will die because of dryness.

The sidewalls of the channels may typically be of conical shape and the web edges may be adapted to the same conical shape to ensure that each edge of each partition web is over its full height in full contact with the channel sidewall. In addition, the webs may have thickened centres or may have locating fins on the web edges to ensure plant bale centering and satisfactory bale fixing between every two webs. Disintegration of the plant bales when the plant is taken out may be avoided by adding glue binder to the earth of the soil ball, if deemed appropriate.

To enable discretional spacing of the young plants in one row it is intended to use single-walled or multi-walled, especially double-walled, webs as partitions. By varying the double wall distances, i.e. between two spaced-apart webs, adaptation to each plant type is possible. A double-walled arrangement of webs can typically be achieved in a plant row by placing between every two webs a cross strip which may slope down to each web and direct the water into the plant rooms.

Another embodiment of the invention is characterised by connecting the partition webs by a single-piece bottom ledge. So the bottom ledge carries a number of the partition webs which separate the plant spaces from one another. The bottom ledge and the webs so create a plant row skeleton with a plurality of spaces for young plants which are easy to lift out of the culture tray channel or, in a special embodiment of the invention, can be pushed out sideways. Pushing out sideways, for which a machine may be used, removes the entire plant row out of the culture tray, so that the spaces, because of their special shapes, allow easy lateral forcing of the plant bales out of the plant row. Taking out the young plants with their bales is also practicable with the use of a machine in a further automation of the work process.

To enable surplus water to drain away without any problem it is a proposed advantage that the bottom ledge should not touch the base of the channel at any point or at few points only. This will allow the water to flow under the row bottom ledge on the base of the channel. The bottom ledge can be arranged higher than the channel base by means of the conical sidewalls and their partition webs, or the bottom ledge may be provided with thickened ends, shaped fins or feet on the underside. Draining the water from the plant spaces is intended through drain holes between every two partition webs or through a lateral cornered or half-round recess to enable all surplus water to flow into the channel. The bottom ledge may be hollow, finned, or reinforced at least sectionwise to additionally provide sufficient interstice between the channel base and the ledge for outflowing water without affecting ledge rigidity, a rigidity that the ledge must feature when being pushed out sideways. The channels themselves may be provided with water outlet holes or may have a lateral opening with a downslope to enable the surplus water to flow out into the water collecting system. In accordance with the invention, the spacing of the channels in the culture tray may be equidistant, or non-equidistant to allow the rooting of different young plants in only one culture tray.

BRIEF DESCRIPTION OF THE DRAWINGS

Moreover, by using a special embodiment of the invention it is possible to cover one or several channels by means of a removable roofing strip. The roofing strip is slightly convexed, round, acute-angled, or stepped, and even a combination of the various configurations is feasible. This will ensure that the water intended for irrigation is supplied only to such channels as are in fact filled with young plants. This will, in particular, help optimise the water supply to the roots and hence save water. This is an important advantage in territories where water is scarce. Furthermore, a reduced supply of water positively influences the climate in the green house and helps avoid plant diseases.

In another embodiment it is proposed that the culture trays of the present invention may be hooked to each other, optionally with a left-hand side end tray and a right-hand side end tray, or a centre tray and both-end trays. In this case, the starting tray is trimmed at its end oriented towards the row of culture trays, and the end tray is also trimmed at its end oriented towards the row of culture trays, and the centre tray is trimmed on both sides in such a way that the starting tray and the end tray can be hooked into each other or in the adjacent centre tray. Accordingly, a centre tray may be connected on either side with an adjacent starting tray or end tray or an adjacent centre tray.

The invention is explained in detail using the following figures, namely:

FIGS. 2 and 3, FIG. 5: A cross-sectional side view along line A—A, being a section through the culture tray, with a stiffening skeleton per FIG. 4, FIG. 6: Perspective view of several roofing strips used for covering a channel in the culture tray.

DETAILED DESCRIPTION OF THE PREFERRED EMBODIMENTS

Figure 1:
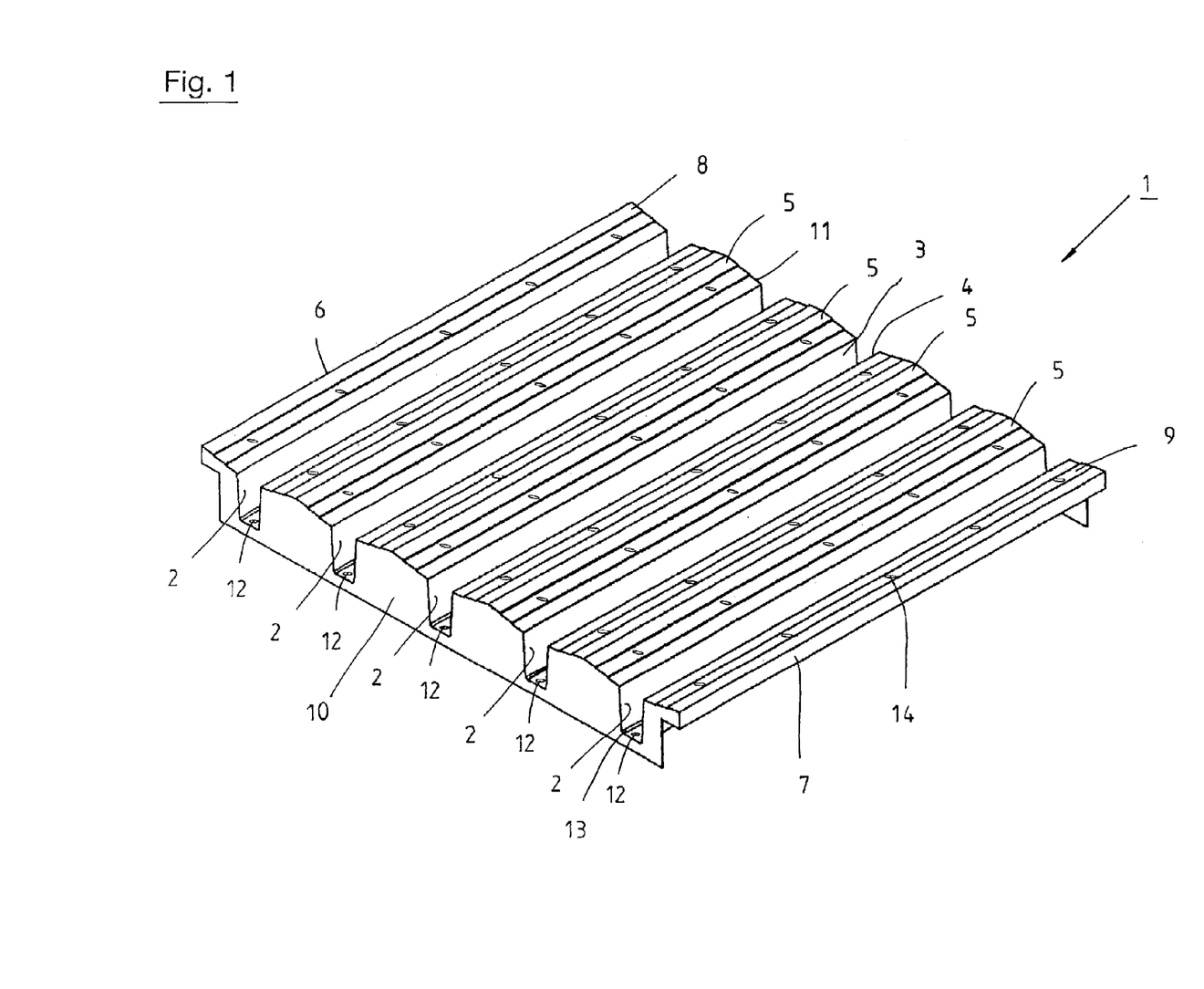
FIG. 1: In a perspective view, a culture tray without inserted plant row skeleton.
Figure 2:
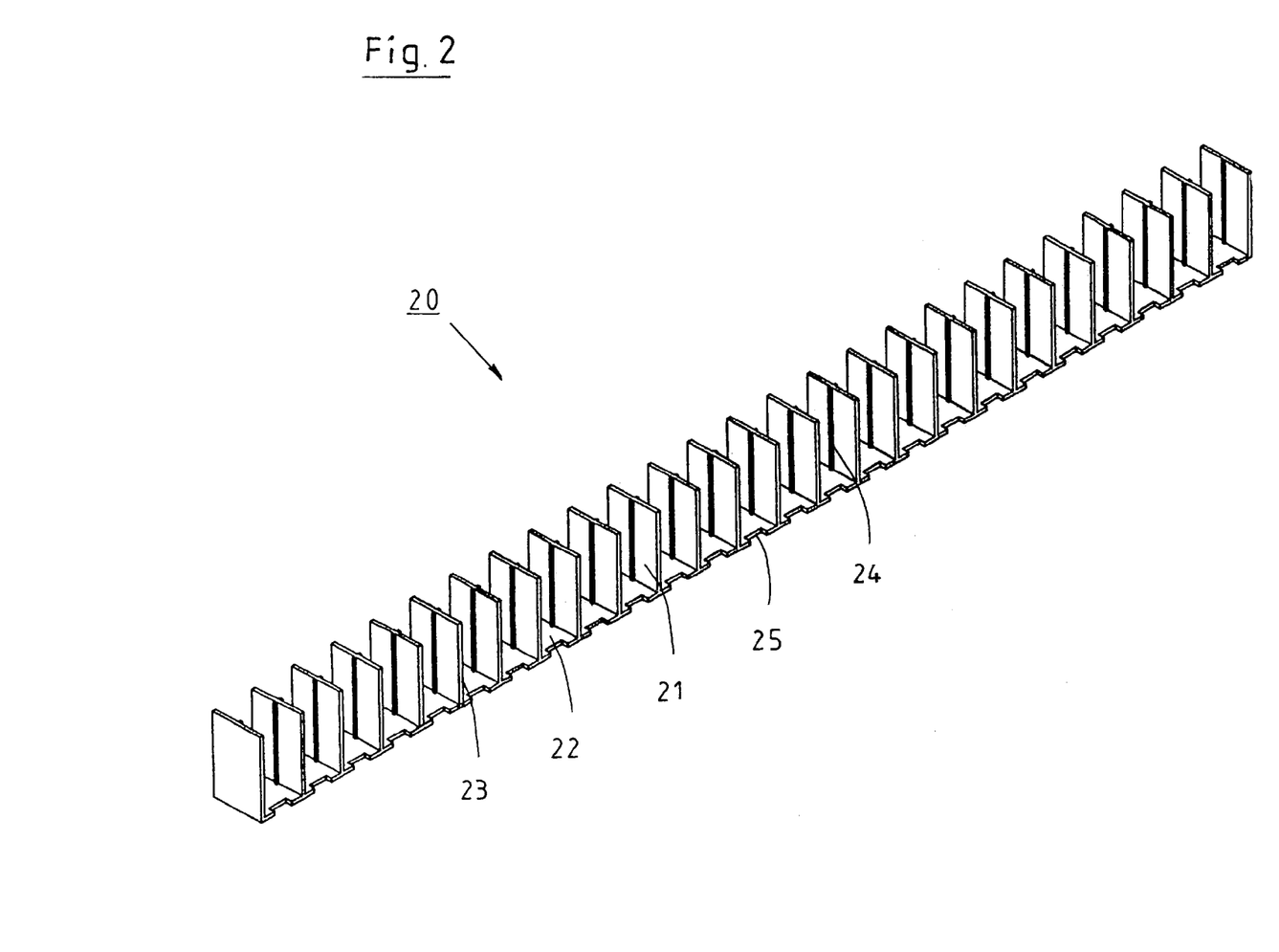
FIG. 2: In a perspective view, an initial design of a row skeleton with single-walled partition webs.
Figure 3:
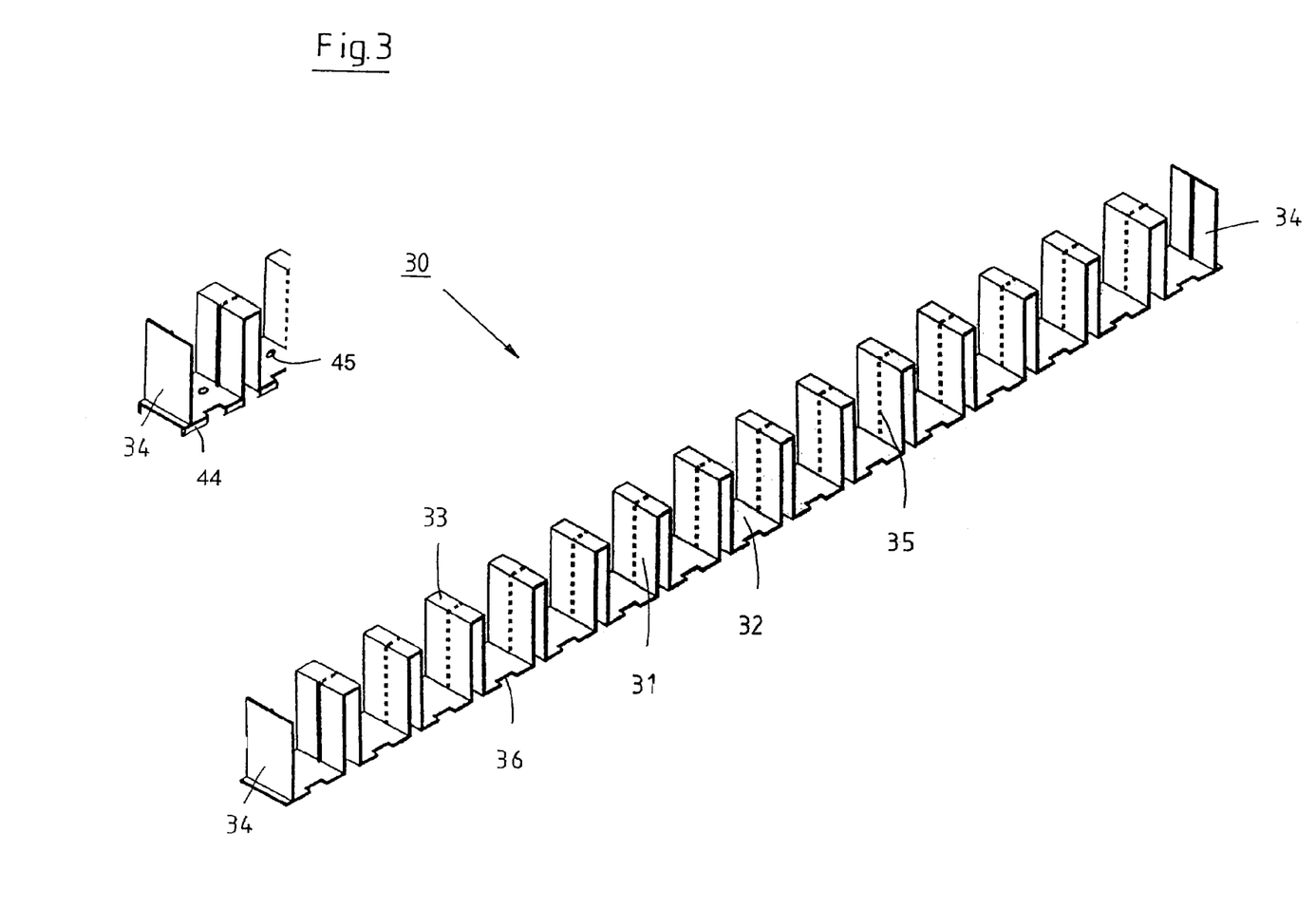
FIG. 3: In a perspective view of another design of a plant row skeleton with double-walled partition webs.

FIG. 1, being a perspective view, shows a culture tray 1 according to the invention, which can be equipped with row skeletons per FIG. 2 or 3. The culture tray 1 is basically a deep drawn plastic component which has transverse channels 2 in equidistant arrangement. It is, of course, possible to make different culture trays 1 in which the distances between the channels vary. Channels 2 have two sidewalls 3, 4 and are open towards the rim of culture tray 1. A roof-shaped elevation 5 can be seen between every two channels. Its structure is stepped in the embodiment shown. Of course, other structures are practicable provided it is made certain that the water intended for irrigation can flow down sideways into the channels 2. Each end tray 6, 7 of the culture tray 1 has one half-side elevation 8, 9 which coresponds to the shape of elevation 5 when the two culture trays 1 have been assembled. The culture tray 1 is stiffened only by means of an end closing wall 10, 11 in a manner to leave the ends of the channels 2 open.

FIG. 2 is a perspective view of a row skeleton 20, which has a number of parallel partition webs 21, interconnected by a single-piece bottom ledge 22. The exemplified row skeleton 20 has nearly rectangular partition webs 21. The webs may also be conical, also the sidewalls 3, 4 of the culture tray 1, so that row skeleton 20 is located at an elevated position in the channel 2 of culture tray 1, such that the web edges 23 are in full contact with channel sidewalls 3, 4. The plant bales of each young plant are held in their positions by a thickened center 24 on either side of partition web 21 to prevent the plant bales from slipping out. Surplus irrigation water can flow away through the rectangular lateral recesses 25 in the bottom plate, each recess 25 located nearly in the middle between two partition webs 21. Alternatively, the recesses may be replaced by holes made in bottom ledge 22 or other, typically semi-circular, openings provided that the holes or openings are large enough to allow the water to drain down to the base of channel 2, when the row skeleton has been placed into culture tray 1. Channel 2 also exhibits one or several holes 12 or a lateral downslope to enable the water to flow from the channels through holes 12 into a water collecting system. To prevent row skeletons 20 from lying on the base of the channel 2 it is possible to provide channels with lateral guide bars 13, or the bottom ledge has a lateral rim, thickened ends, shaped fins or feet on its underside. Channels 2 are provided with stops 14 on the elevations 5,8,9, against which roofing elements are placed.

FIG. 3 is a perspective view of another embodiment of a row skeleton 30, also with a single-piece ledge. The partition webs of row skeleton 20 of FIG. 2 are single-walled, but the webs 31 are double-walled, the bottom ledge 32 not being a single-piece ledge and partition webs 31 connected on top by a cross strip 33. The ends of row skeleton 30 have single-walled webs 34. These webs 31, 34 again exhibit thickened centers 35 intended to fix the plant bales. The interrupted bottom ledge 32 has rectangular recesses 36, nearly in the middle of each plant space. For increased stability it is possible to reinforce segments of bottom ledge 32 or connect the segments in the foot regions of webs 31 by means of additional bracing under ledge 32. From the partial FIGURE the water outlet hole 45 as well as the side rim 44 can be seen.

Figure 4:
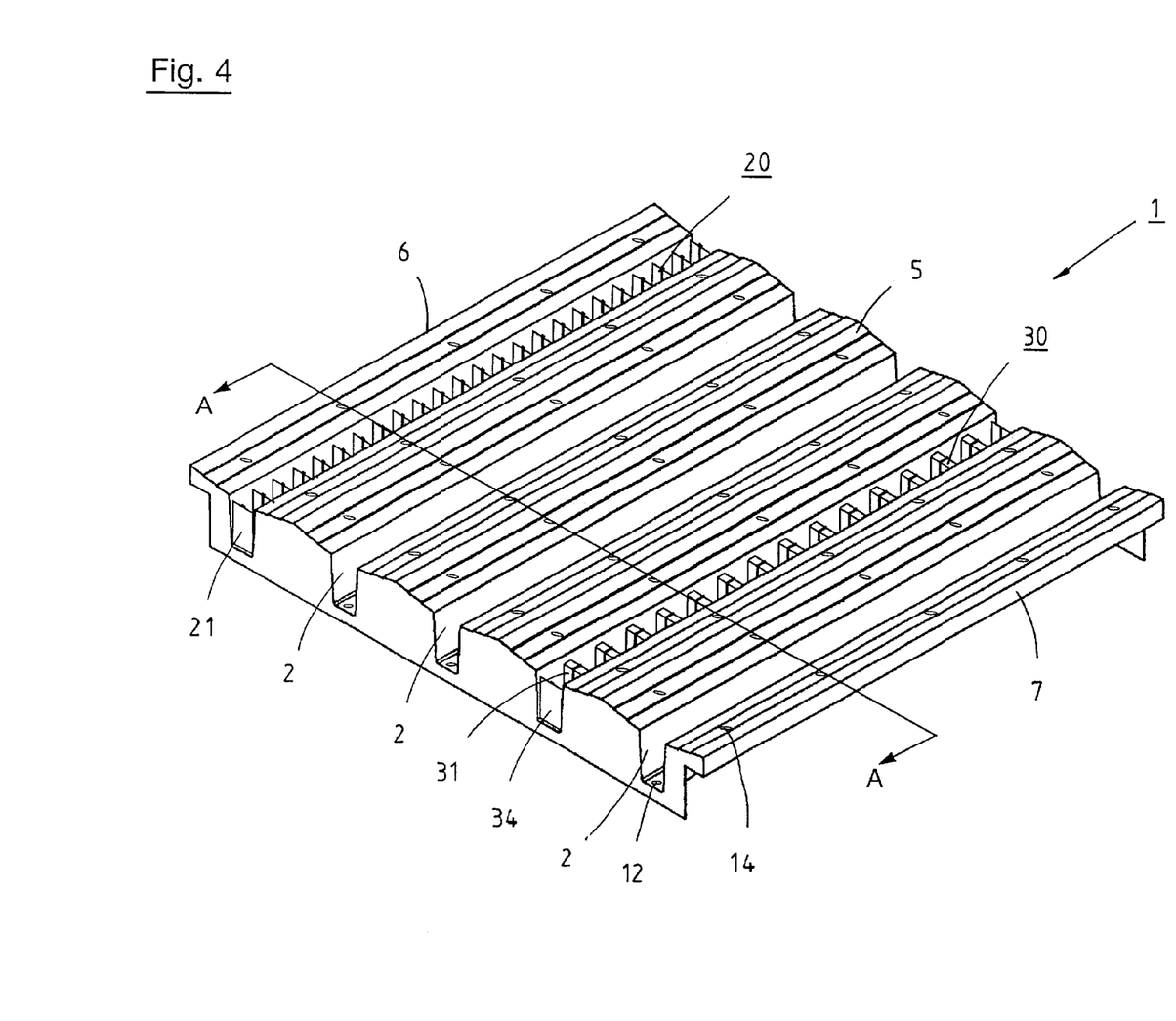
FIG. 4: A culture tray according to the invention per FIG. 1, with inserted row skeletons per

FIG. 4 is a perspective view of a culture tray 1 in accordance with FIG. 1, two of the existing channels 2 containing row skeletons 20 or 30. The culture tray 1 is identical with the culture tray 1 of FIG. 1 and the row skeletons 20 and 30 are identical with the row skeletons of FIGS. 2 and 3. The row skeleton 20, with the parallel partition webs 21, is positioned in the left-hand outer channel 2 whilst row skeleton 30, with double-walled partition webs 31, is positioned in a middle channel 2.

Figure 5:
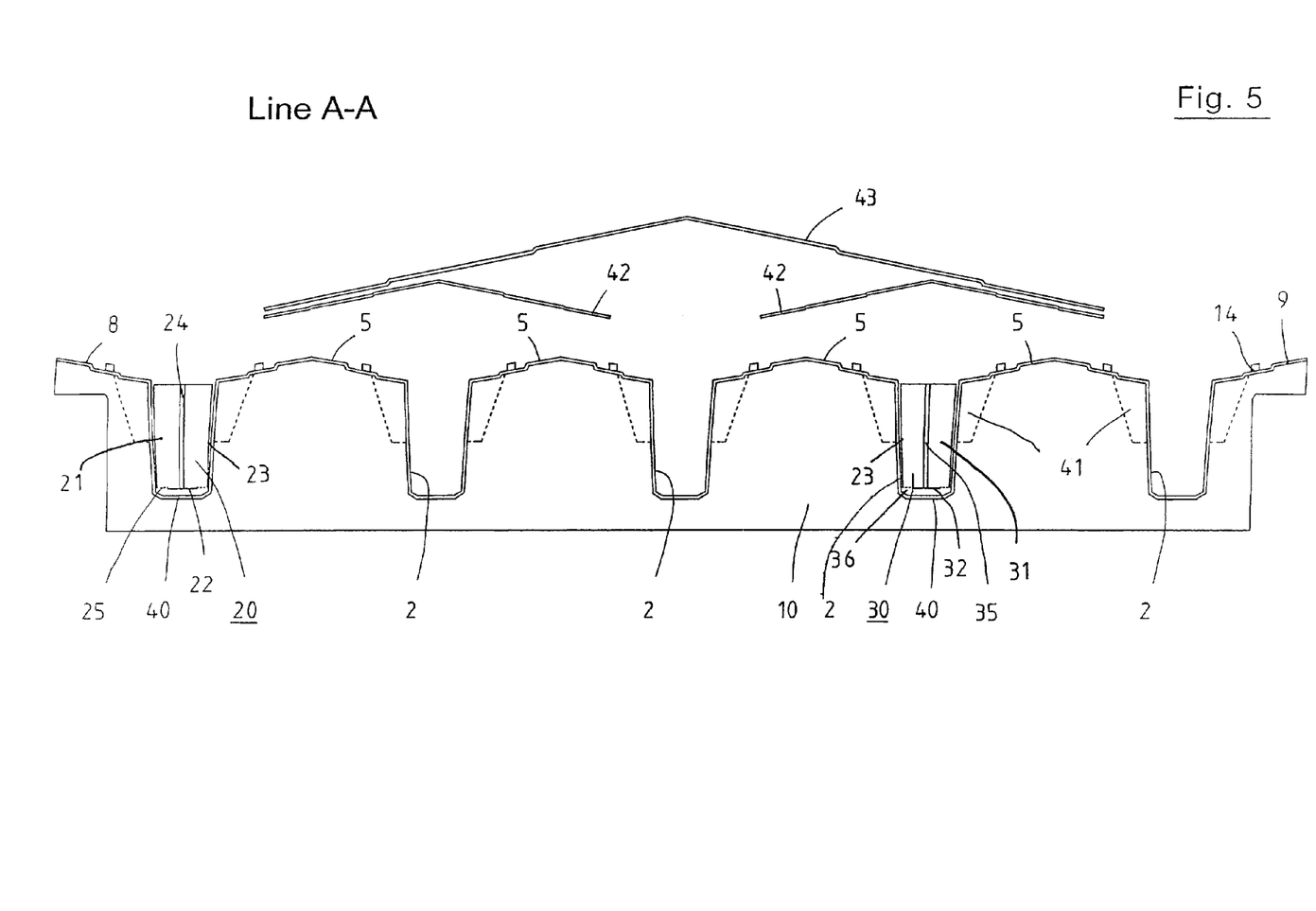

The sectional view of culture tray 1 of FIG. 5 clearly shows channels 2 arranged at distances apart, the left-hand channel 2 containing a row skeleton 20 and a middle channel 2 containing a row skeleton 30. A partition web 21 or 31 and a bottom ledge 22 and 32 being parts of the two row skeletons 20 and 30 are shown. Partition webs 21 and 31 have conically shaped web edges 23, so that the row skeletons 20 and 30 are held in an elevated position in channel 2. Alternatively it is possible to provide on bottom ledges 22 and 32 thickened pieces, shaped fins, or feet intended to avoid full contact with the base 40 of channel 2. The surplus irrigation water can drain away from row skeletons 20 and 30 of FIGS. 2 and 3 through lateral recesses 25 and 36, shown as broken lines in the sectional views. Culture tray 1 is reinforced by single-piece reinforcement strips 41 provided on the side of shaped channels 2, but not shown, connecting sidewalls 3 and 4 with elevations 5. Elevations 5, see FIG. 1, are step-shaped to cause the water intended for irrigation to flow into channel 2. Elevations 5 have integrally shaped single-piece stops 14. The stops serve to establish contact with optional roofing strips.

The roofing strips 42 and 43 serve to cover one or three channels 2 and are preferred for the growing of plants that require greater spacing because of their larger leaves. The removable roofing strips 42 and 43 are also step-shaped in our example, but it is easily practicable to employ one of the other roofing strips 80–97. The roofing strips 42 and 43 and the further roofing strips 80–97 of FIGS. 6 and 7 ensure that the water supplied for irrigation can flow only into the channels 2 in which there are row skeletons 20 and 30 with plants whilst the other channels 2 are covered against the water. This particular measure ensures that only so much water must be supplied as is necessary for the irrigation of the plants, and uniform moistening of the plant pots is warranted and reduced amount of water is needed. The employment of the roofing strips 42 and 43 also renders the rooting of big young plants or large-leaved plants possible in culture trays 1 and guarantees that none of the pots can get dry, but each individual pot is supplied with enough water.

Figure 6:
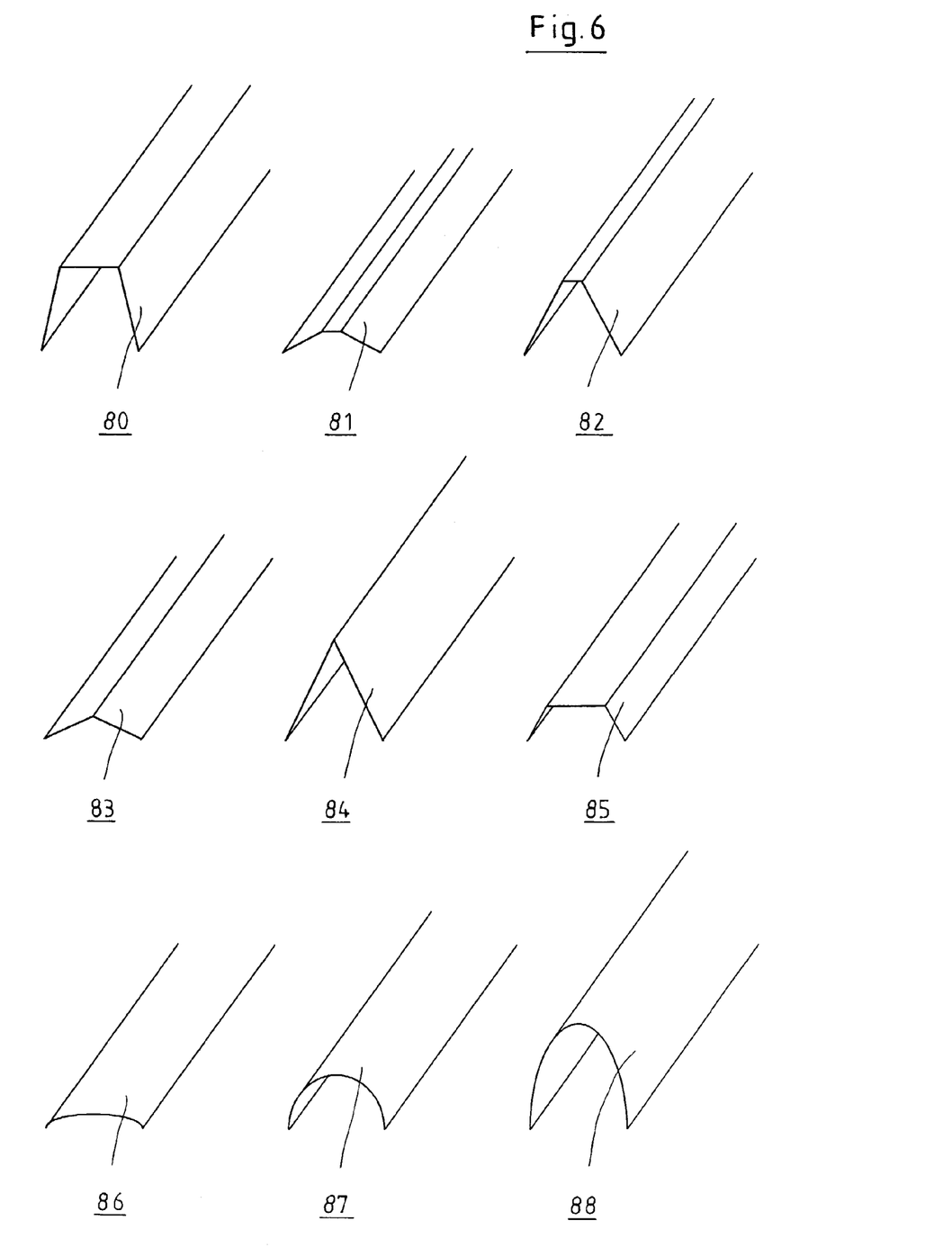
Figure 7:
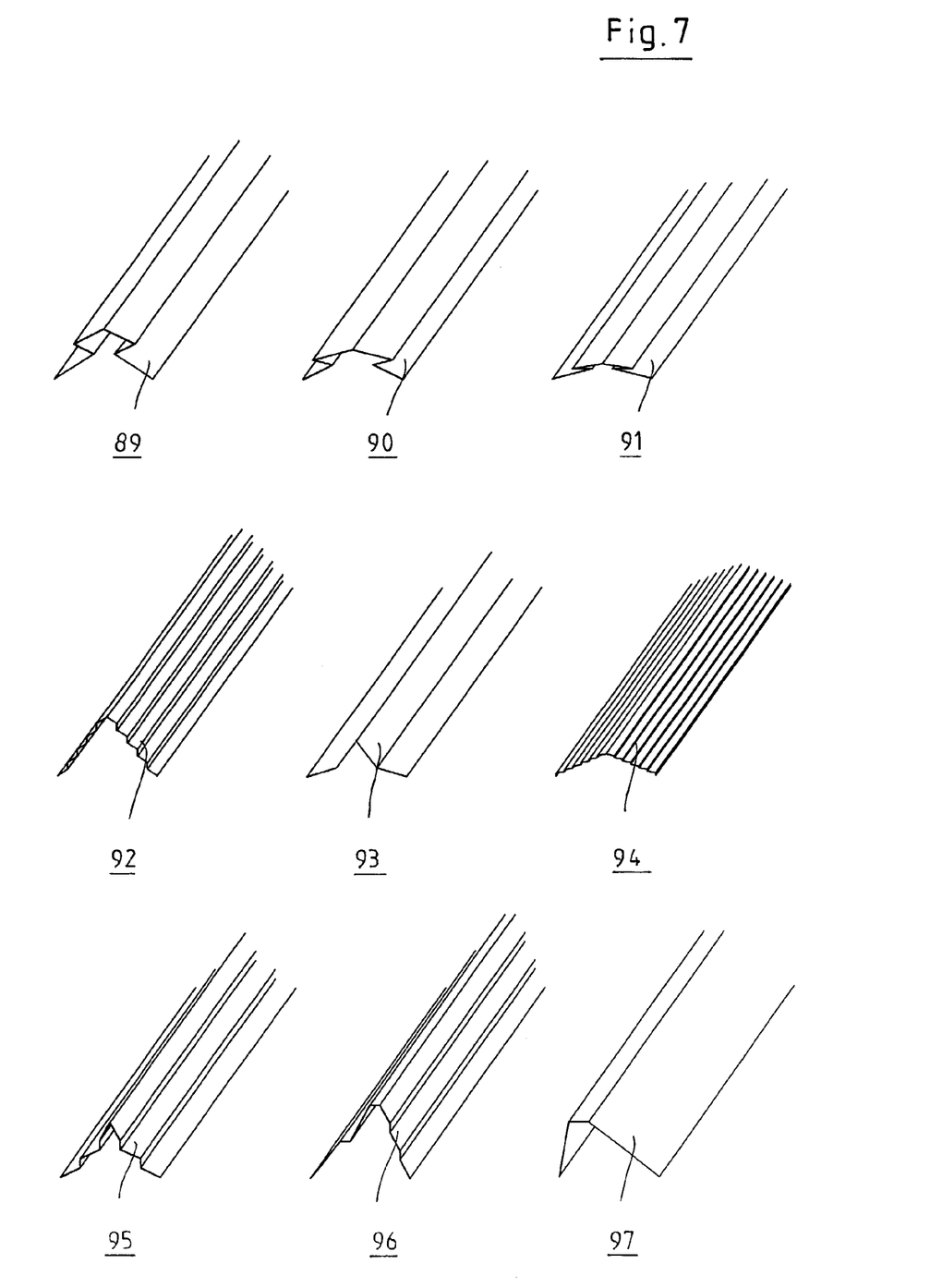
FIG. 7: Perspective views of further roofing strips per FIG. 6.

FIGS. 6 and 7 are perspective views of several roofing strips 80 to 97, which may be used for covering the channel 2 of culture trays 1. The roofing strips 80 to 97 may be so shaped in size that they cover one single channel 2, or two or three channels 2 at the same time. It must be made certain for this purpose that a downslope is formed to the lateral channels 2, which run in parallel, so as to enable the water supplied for irrigation can flow down immediately into the space where the young plants are to take roots. The roofing strips 80 to 97 are of different shapes, typically round, convexed or triangular, with or without flattening. Moreover, step-shaped, trapezoidal, or a combination of several shapes can be used.

DRAWING LEGEND

1 Culture tray
2 Channel
3 Sidewall
4 Sidewall
5 Elevation
6 End tray
7 End tray
8 Elevation
9 Elevation
10 Closing wall
11 Closing wall
12 Hole
13 Guide bar
14 Stops
20 Row skeleton
21 Partition web
22 Bottom ledge
23 Side edge
24 Thickened centre
25 Recess
30 Row skeleton
31 Partition web
32 Bottom ledge
33 Cross strip
34 Partition web
35 Thickened centre
36 Recess
40 Base area
41 Reinforcement strips
42 Roofing strips
43 Roofing strips
44 Side rim
45 Hole
80–97 Roofing strips

What is claimed is:

1. A culture tray for young plants to take root comprising:
   (a) a plurality of parallel channels having respective sidewalls and at least one open end, said channels extending in a longitudinal direction and arranged at selected distances from each other for accommodating the plants; and
   (b) a plurality of independent bilaterally open-sided planting row skeletons, each skeleton comprising a bottom ledge having a plurality of partition webs connected by the ledge and being arranged in a respective channel so that said partition webs are arranged in the channel transversely to said longitudinal direction to define a plurality of planting areas, each planting area being limited by two sidewalls of the channel arranged right-angled to the planting area to define space boundaries for radicular planting bales during breeding of the plants, and wherein the planting row skeleton is formed in such a way that the planting row skeleton, after rooting of the plants, can laterally be pushed out of the respective channel so that the radicular planting bales rest on the ledge and are merely separated by partition webs and two radicular bale surfaces arranged transversely to the longitudinal direction are open.

2. The culture tray according to claim 1, wherein the partition webs have thickened centers on each side of the webs to retain the plants in position.

3. The culture tray according to claim 1, wherein the partition webs are single-walled or multiple-walled having at least two walls.

4. The culture tray according to claim 1, wherein each channel comprises a base area, and the planting row skeleton is arranged at an elevated position relative to the base area.

5. The culture tray according to claim 4 wherein the bottom ledge is not in contact with the base area of the channel or is in contact with the base area only at selected points.

6. The culture tray according to claim 1, wherein the bottom ledge has an underside opposite the partition webs comprising a side rim, a thickened section, shaped fins, or feet.

7. The culture tray according to claim 1, wherein the bottom ledge has a water outlet hole or a lateral angular or semi-circular recess between every two partition webs in the channel.

8. The culture tray according to claim 1, wherein the bottom ledge has a hollow, finned, or at least segment-wise reinforced shape.

9. The culture tray according to claim 1, wherein the channels are arranged at equal or unequal distances from each other.

10. The culture tray according to claim 1, wherein the channels comprise a water outlet hole or a downslope to a lateral opening to enable surplus water to flow out of the channels into a water collection system.

11. The culture tray according to claim 1, wherein the sidewalls of adjacent channels are connected by a raised elevation.

12. The culture tray according to claim 1, wherein a removable roofing strip covers at least one channel.

13. The culture tray according to claim 12 wherein the roofing strip has a slightly convex, round, acute-angle, or stepped shape.

* * * * *